(12) United States Patent
Gan

(10) Patent No.: US 9,696,767 B2
(45) Date of Patent: Jul. 4, 2017

(54) COMMAND RECOGNITION METHOD INCLUDING DETERMINING A HOLD GESTURE AND ELECTRONIC DEVICE USING THE METHOD

(71) Applicants: LENOVO (BEIJING) CO., LTD., Beijing (CN); BEIJING LENOVO SOFTWARE LTD., Haidian District, Beijing (CN)

(72) Inventor: Dayong Gan, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 250 days.

(21) Appl. No.: 13/623,392

(22) Filed: Sep. 20, 2012

(65) Prior Publication Data

US 2014/0078073 A1    Mar. 20, 2014

(30) Foreign Application Priority Data

Sep. 20, 2011    (CN) .......................... 2011 1 0279712

(51) Int. Cl.
*G06F 1/16* (2006.01)
*G06F 3/0488* (2013.01)
*G06F 3/0354* (2013.01)

(52) U.S. Cl.
CPC .......... *G06F 1/169* (2013.01); *G06F 3/03547* (2013.01); *G06F 3/04883* (2013.01);
(Continued)

(58) Field of Classification Search
CPC ............ G06F 2200/1636; G06F 3/017; G06F 3/04883; G06F 1/169; G06F 3/03547; G06F 2203/0339; G06F 2203/04808
(Continued)

(56) References Cited

U.S. PATENT DOCUMENTS 6,005,549 A * 12/1999 Forest ..................... G06F 3/011
345/157
8,253,551 B2 * 8/2012 Tsai ....................... B60K 28/06
340/438
(Continued)

FOREIGN PATENT DOCUMENTS

CN    101133385    2/2008
CN    101464779 A    6/2009
(Continued)

OTHER PUBLICATIONS

Chinese First Office Action with English Translation for related Application No. 2011102797120.8 dated Feb. 3, 2015, 21 pages.
(Continued)

*Primary Examiner* — Kumar Patel
*Assistant Examiner* — Sejoon Ahn
(74) *Attorney, Agent, or Firm* — Brinks Gilson & Lione; G. Peter Nichols

(57) ABSTRACT

A command recognition method and electronic device using the method are described. The command recognition method includes obtaining at least two first contact points at side edge of the electronic device; determining a holding gesture with respect to the electronic device according to the at least two first contact points; obtaining at least one second contact point at which contact state is changed on a side edge of the electronic device in a predetermined time period; based on the holding gesture, the at least one second contact point and its corresponding contact state change, recognizing corresponding command. By use of the command recognition method, it can favorably achieve the recognition of the operation command with respect to the electronic device in the case that the number of keys in the electronic device (even no key) is reduced, thereby achieving effective control to the electronic device.

7 Claims, 5 Drawing Sheets

(52) U.S. Cl.
CPC ............... *G06F 2203/0339* (2013.01); *G06F 2203/04808* (2013.01)

(58) Field of Classification Search
USPC ................................................. 345/173–174
See application file for complete search history.

(56) References Cited

U.S. PATENT DOCUMENTS

| | | | | |
|---|---|---|---|---|
| 8,797,265 | B2* | 8/2014 | Silvester | 345/158 |
| 2006/0197750 | A1* | 9/2006 | Kerr et al. | 345/173 |
| 2010/0013780 | A1* | 1/2010 | Ikeda | G06F 3/04883 345/173 |
| 2010/0085317 | A1* | 4/2010 | Park | G06F 1/1626 345/173 |
| 2010/0138680 | A1* | 6/2010 | Brisebois et al. | 713/324 |
| 2010/0156941 | A1* | 6/2010 | Seung | 345/660 |
| 2011/0102334 | A1* | 5/2011 | Colley | G06F 3/0418 345/173 |
| 2011/0148915 | A1* | 6/2011 | Kim | G06F 1/1626 345/619 |
| 2013/0038532 | A1* | 2/2013 | Okura | A63F 13/06 345/158 |
| 2013/0050139 | A1* | 2/2013 | Gute | G06F 1/1626 345/174 |
| 2013/0154999 | A1* | 6/2013 | Guard | 345/174 |
| 2013/0328804 | A1* | 12/2013 | Oshima | G06F 3/04842 345/173 |

FOREIGN PATENT DOCUMENTS

| | | |
|---|---|---|
| EP | 2 284 646 | 2/2011 |
| EP | 2306363 A1 | 4/2011 |
| EP | 2 770 400 | 8/2014 |
| WO | WO 2011069925 A2 * | 6/2011 |

OTHER PUBLICATIONS

Third Office Action dated Apr. 19, 2016 out of corresponding Chinese priority Application No. 201110279712.8 (21 pages including English translation).

Second Office Action dated Oct. 10, 2015 out of corresponding Chinese priority Application No. 201110279712.8 (25 pages including English translation).

* cited by examiner

COMMAND RECOGNITION METHOD INCLUDING DETERMINING A HOLD GESTURE AND ELECTRONIC DEVICE USING THE METHOD

This application claims priority to CN 201110279712.8 filed on Sep. 20, 2011, the entire contents of incorporated herein by reference.

TECHNICAL FIELD

The present invention relates to operation command recognition of electronic device, and particularly relates to a command recognition method and an electronic device using said command recognition method.

BACKGROUND

Currently, at least one key is disposed on a mobile phone, and user triggers operations to the mobile phone by pressing key(s). Due to the existence of the key(s), in the case that the size of display screen is fixed, the existence of the key(s) will increase the size of mobile phone; on the other hand, in the case that the size of mobile phone is fixed, the existence of the key(s) will decrease the size of display screen.

Consequently, the number of keys is reduced as much as possible in the existing mobile phone design, and display screen is implemented as touch screen, thereby realizing operations to mobile phone. Although such mobile phone design can achieve excellent tradeoff between the number of keys and the size of display screen to some extent, there's still at least one key in the mobile phone, for example, user interface home page display key (home key).

Besides, it is not convenient to implement the following operations by touch screen, for example, when photographing, it is inconvenient to make camera operations by touch screen; when shutdown, it is also inconvenient to make shutdown operation by touch screen; when listening to audio or watching video, it is also inconvenient to make volume adjustment operations by touch screen. Therefore, sometimes volume controlling key, power key, camera key etc. are provided on mobile phone.

Therefore, it is desirable to provide a mobile phone without key(s) and a command recognition method for said mobile phone without key(s), and correspondingly, an electronic device without key(s) and a command recognition method for said electronic device without key(s).

SUMMARY OF INVENTION

Considering the above problems, the present invention is proposed. The object of the present invention is to provide an electronic device and a command recognition method, the edges of said electronic device are divided into several operation areas, by recognizing holding gesture of said electronic device at first, contact point at which contact state is changed is detected, then the operation command to said electronic device is recognized according to the recognized holding gesture and the detected contact point(s) at which contact state is changed.

According to an aspect of the present invention, an command recognition method for an electronic device is provided, the command recognition method comprises the steps of: obtaining at least two first contact points at side edge of the electronic device; according to the at least two first contact points, determining holding gesture with respect to the electronic device; obtaining at least one second contact point at which the contact state is changed on side edge of the electronic device in predetermined time period; based on the holding gesture, the at least one second contact point and its corresponding contact state change, recognizing corresponding command.

According to an embodiment of the present invention, in the command recognition method, obtaining at least one second contact point at which the contact state is changed on side edge of the electronic device in predetermined time period comprises: obtaining contact points on side edge of the electronic device at a first timing in the predetermined time period; and extracting contact point which is not included in the at least two first contact points from the contact points obtained at the first timing, so as to be the at least one second contact point.

According to an embodiment of the present invention, in the command recognition method, obtaining at least one second contact point at which the contact state is changed on side edge of the electronic device in predetermined time period comprises: obtaining contact points on side edge of the electronic device and their corresponding contact pressures at a first timing in the predetermined time period; and extracting the at least one second contact point from the contact points obtained at the first timing, the at least one second contact point is a part of the at least two first contact points, and the contact pressure of each of the at least one second contact point at the first timing is greater than a predetermined threshold.

According to an embodiment of the present invention, in the command recognition method, obtaining at least one second contact point at which the contact state is changed on side edge of the electronic device in predetermined time period comprises: obtaining contact points on side edge of the electronic device at a first timing in the predetermined time period; extracting contact point which is not included in the contact points obtained at the first timing from the at least one first contact point, so as to be a first part of the at least one second contact point; obtaining contact points on side edge of the electronic device at a second timing in the predetermined time period; and extracting contact point which is not included in the contact points obtained at the first timing from the contact points at side edge of the electronic device obtained at the second timing, so as to be a second part of the at least one second contact point.

According to an embodiment of the present invention, in the command recognition method, the side edge of the electronic device is divided into 6 operation areas, a contact at any point in one operation area is obtained as one contact point, when simultaneous contacts at the second, fifth and sixth area are detected, the holding gesture with respect to the electronic device is recognized as right-hand holding; when simultaneous contacts at the second, third and sixth area are detected, the holding gesture with respect to the electronic device is recognized as left-hand holding; or when simultaneous contacts at the second, third, fifth and sixth area are detected, the holding gesture with respect to the electronic device is recognized as two-hands holding.

According to another aspect of the present invention, an electronic device is provided, and the electronic device comprises: contact point detecting unit, for obtaining at least two first contact points at side edge of the electronic device; holding gesture determining unit, for determining holding gesture with respect to the electronic device according to the at least two first contact points; changed contact point detecting unit, for obtaining at least one second contact point at which contact state is changed at side edge of the electronic device in predetermined time period after the holding gesture determining unit has determined the holding gesture; and command recognition unit, for recognizing corresponding command based on the holding gesture, the at least one second contact point and its corresponding contact state.

According to an embodiment of the present invention, the electronic device further comprising: contact point storage unit, for storing at least two first contact points obtained by the contact point detecting unit.

In the electronic device, the contact point detecting unit further obtains contact points at side edge of the electronic device at a first timing in the predetermined time period; and the changed contact point detecting unit extracts contact point which is not included in the at least two first contact points stored in the contact point storage unit from the contact points obtained at the first timing, so as to be the at least one second contact point.

In the electronic device, the contact point detecting unit further obtains contact points at side edge of the electronic device and its corresponding contact pressures at a first timing in the predetermined time period; and the changed contact point detecting unit extracts the at least one second contact point from contact points obtained at a first timing, the at least one second contact point is a part of the at least two first contact points stored in the contact point storage unit, and contact pressure of each contact point of the at least one second contact point at the first timing is greater than a predetermined threshold.

In the electronic device, the contact point detecting unit further obtains contact points at side edge of the electronic device at a first timing in the predetermined time period; the changed contact point detecting unit extracts contact point which is not included in the contact points obtained at the first timing from the at least two first contact points stored in the contact point storage unit, so as to be a first part of the at least one second contact points; the contact point detecting unit further obtains contact points at side edge of the electronic device at a second timing in the predetermined time period; and the changed contact point detecting unit extracts contact point which is not included in the contact points obtained at the first timing from contact points at side edge of the electronic device obtained at the second timing, so as to be a second part of the at least one second contact point.

According to still another aspect of the present invention, an command recognition method for an electronic device is provided, the command recognition method comprises steps of: obtaining holding gesture with respect to the electronic device; based on the holding gesture, determining at least one particular detection area at side edge of the electronic device; obtaining operation information from the at least one particular detection area; and based on the operation information, recognizing command corresponding to the operation information.

According to an embodiment of the present invention, in the command recognition method, the holding gesture with respect to the electronic device includes at least one of the following: left-hand holding, right-hand holding and two-hands holding. For each holding gesture, at least one particular detection area corresponding to the holding gesture is set.

According to an embodiment of the present invention, each particular detection area has its corresponding command set, and each of the command set includes at least one command.

According to yet another aspect of the present invention, an electronic device is provided, comprising: holding gesture obtaining unit, for obtaining holding gesture with respect to the electronic device; particular detection area determining unit, for determining at least one particular detection area at side edge of the electronic device based on the holding gesture; operation information obtaining unit, for obtaining operation information from the at least one particular detection area; and command recognition unit, for recognizing command corresponding to the operation information based on the operation information.

BRIEF DESCRIPTION OF THE DRAWINGS

By detailed description to the embodiments of the present invention in conjunction with appended drawing, the above and other object, feature and advantage will be more apparent, wherein.

DETAILED DESCRIPTION

In the following, by referring to appended drawings, command recognition method and electronic device using said command recognition method will be described.

Figure 1:
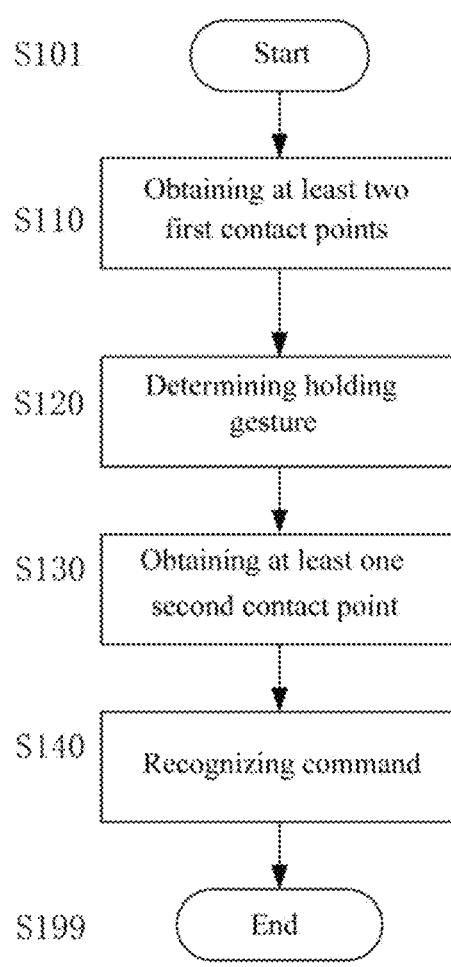
FIG. 1 illustrates flowchart of command recognition method according to an embodiment of the present invention.

Firstly, the command recognition method of electronic device according to an embodiment of the invention will be explained by referring to FIG. 1.

The command recognition method 100 according to an embodiment of the present invention begins at step S101.

At step S110, at least two first contact points at side edge of said electronic device are obtained. For example, said contact points are generated by fingers of user touching side edge of the electronic device.

At step S120, according to the at least two first contact points, holding gesture to the electronic device is determined. As an example, the holding gestures include at least one of the following gestures: left-hand holding, right-hand holding and two-hands holding. As another example, the holding gestures include at least one of the following gestures: left-hand lateral holding, left-hand longitudinal holding, right-hand lateral holding, right-hand longitudinal holding, two-hands lateral holding, and two-hands longitudinal holding.

At step S130, at least one second contact point at which contact state is changed at side edge of the electronic device is obtained in predetermined period.

As an example, said at least one second contact point includes at least one contact point which is different from said at least two first contact points, wherein change of said contact state includes touching at least one contact point which is different from said at least two first contact points. As an example, referring to the case as shown by c) in FIG.

3, wherein, in right-hand holding, the state of right-hand holding is not changed, but the contact areas in the upper and lower part of the mobile phone are pressed by the other hand at the same time.

Figure 2A:
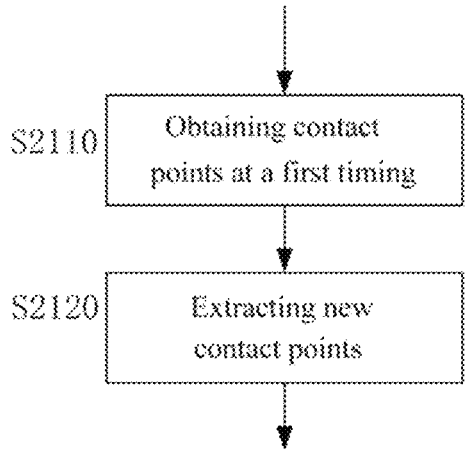
FIG. 2A, FIG. 2B, and FIG. 2C illustrate flowcharts of three exemplary methods of obtaining changed contact points in the command recognition method according to the embodiment of the present invention.

Such situation is described by referring to FIG. 2A, at step S2110, at a first timing within the predetermined period, contact points at side edge of the electronic device are obtained; at step S2120, contact point which is not included in the at least two first contact points is extracted from the contact points obtained at the first timing, so as to be the at least one second contact point.

As another example, said at least one second contact point is part of contact points of the at least two first contact points; and change of the contact state include one of the following changes: moving away from said part of contact points, touching said part of contact points again and pressing said part of contact points; and directly pressing said part of contact points, i.e., increasing contact pressure without moving away from said part of contact points. As an example, referring to the cases as shown by a) and e) in FIG. 3, in a) of FIG. 3, in right-hand holding, thumb moves away or does not move away from the contact area at side edge of the mobile phone, and presses the contact area; in e) of FIG. 3, in right-hand holding, index finger moves away or does not move away from the contact area at side edge of the mobile phone, and presses the contact area. As another example, referring to the cases as shown by f) in FIG. 3, wherein, in two-hands holding, thumb and index finger of the right hand move away or do not move away from the contact areas at side edges of the mobile phone, and press the contact areas where the fingers located.

Figure 2B:
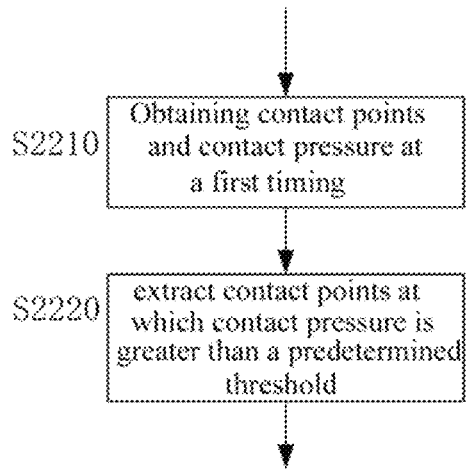

Such situation is described by referring to FIG. 2B, at step S2210, at a first timing within the predetermined period, contact points at side edge of the electronic device and their corresponding contact pressure are obtained; at step S2120, said at least one second contact point is extracted from the contact points obtained at the first timing, wherein said at least one second contact point is part of the at least two first contact points and the contact pressure of each contact point of said at least one second contact point at the first timing is greater than a predetermined threshold.

As another example, said at least one second contact point includes: one contact point of said at least two first contact points and another contact point which is different from said at least two first contact points, wherein, said change of contact state includes: moving away from said one contact point of said at least two first contact points, and touching said another contact point which is different from said at least two first contact points. As an example, referring to the cases as shown by b) and d) in FIG. 3, in b) of FIG. 3, in right-hand holding, thumb moves away its original contact area, and presses a new contact area; in d) of FIG. 3, in right-hand holding, index finger moves away its original contact area, and presses a new contact area.

Figure 2C:
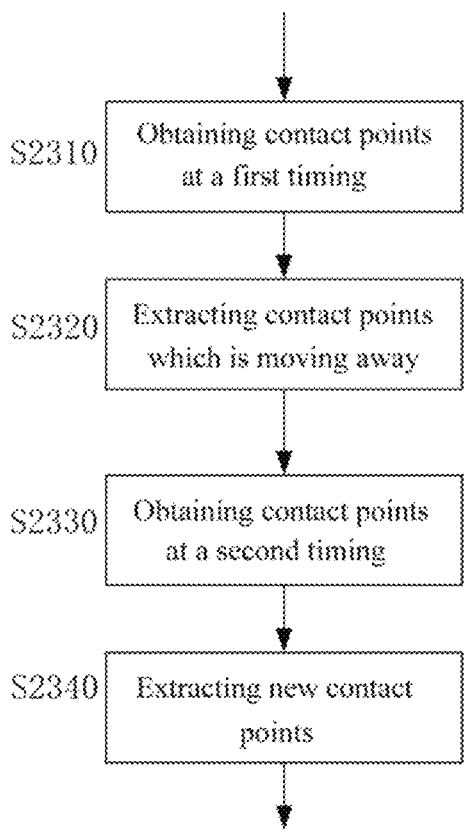

Such situation is described by referring to FIG. 2C, at step S2310, at a first timing within the predetermined period, contact points at side edge of the electronic device are obtained; at step S2320, contact point which is not included in the contact points obtained at the first timing is extracted from the at least one first contact points, so as to be a first part of the at least one second contact point. At step S2330, at a second timing within the predetermined period, contact points at side edge of the electronic device are obtained; and at step S2340, contact point which is not included in the contact points obtained at the first timing is extracted from the contact points at side edge of the electronic device obtained at the second timing, so as to be a second part of the at least one second contact point.

Figure 3:
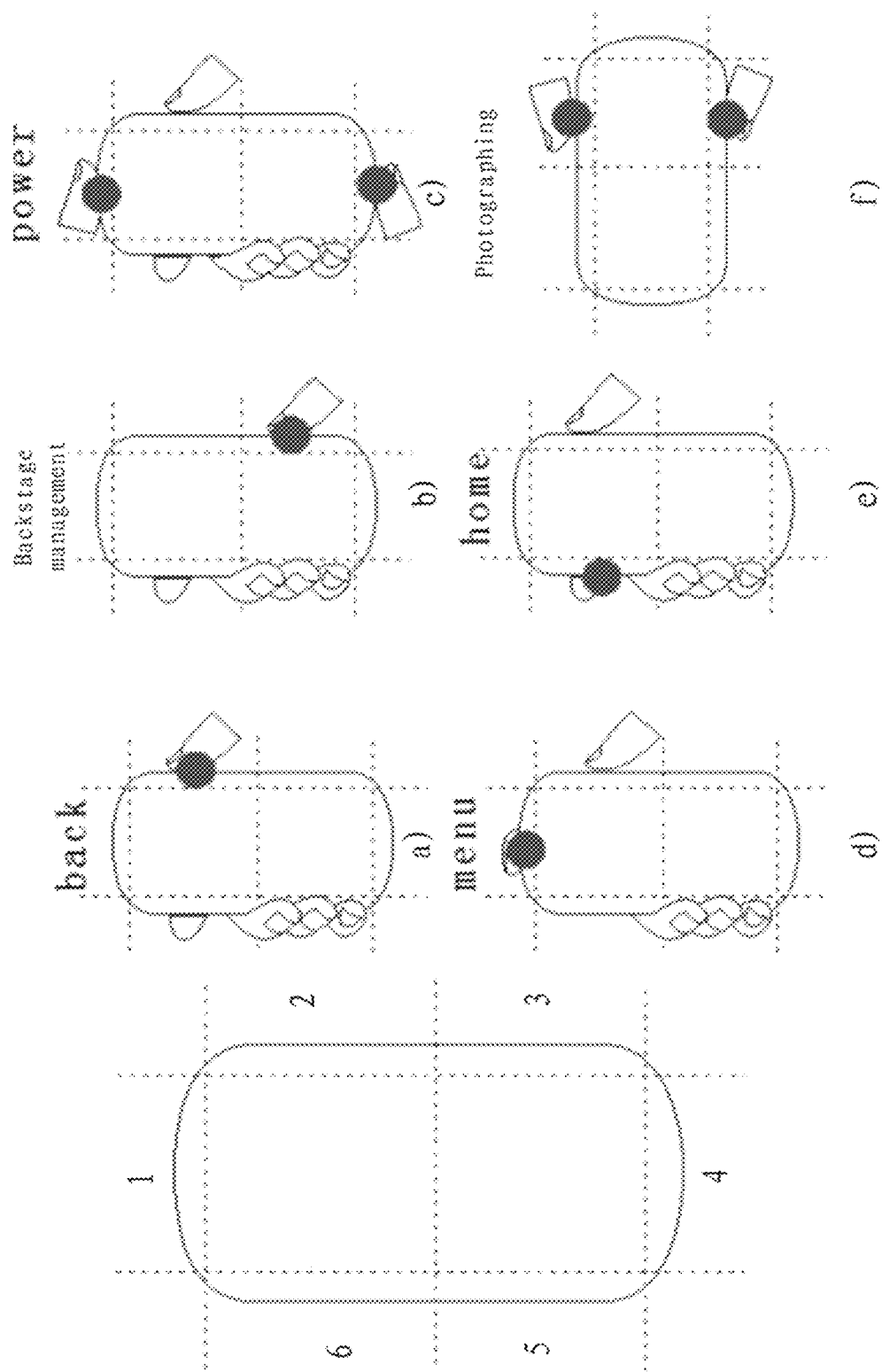
FIG. 3 illustrates operations of right hand holding of the exemplary electronic device and corresponding commands according to the embodiment of the present invention.

Preferably, from the top of the electronic device clockwise, the side edge of the electronic device is divided into 6 areas (first to sixth area, as shown by reference numerals 1-6 on the left of FIG. 3), touching at any point within one operation area is obtained as one contact point.

In this case, as an example, when simultaneous contacts at the second, fifth, sixth area are detected, the holding gesture about the electronic device is recognized as right-hand holding. In addition, when simultaneous contacts at the third, fifth, sixth area are detected, the holding gesture about the electronic device is also recognized as right-hand holding.

As an example, when simultaneous contacts at the second, third, sixth area are detected, the holding gesture about the electronic device is recognized as left-hand holding. In addition, when simultaneous contacts at the second, third, fifth area are detected, the holding gesture about the electronic device is also recognized as left-hand holding.

As an example, when simultaneous contacts at the second, third, fifth, sixth area are detected, the holding gesture about the electronic device is recognized as two-hands holding.

Though it only shows command recognition examples of right-hand holding (right-hand longitudinal holding) in FIG. 3, the present invention is not limited to this, and those skilled in the art can get command recognition examples of left-hand holding (left-hand longitudinal holding), left-hand lateral holding and right-hand lateral holding correspondingly.

Then, at step S140, based on said holding gestures, said at least one second contact point and its corresponding contact state change, corresponding command is recognized.

As an example, as shown in FIG. 3, in the case that the simultaneous contacts at the second, fifth, sixth area are recognized as right-hand holding, when it is detected that the thumb moves away from the second area and presses the second area again or the thumb does not move away from the second area but directly presses the second area, the command is recognized as back command, for example, going back to the previous page, cancelling the previous edit operations to the documents, etc.; when it is detected that the thumb moves away from the second area and presses the third area, the command is recognized as running backstage management program, for example, the backstage management program is running so as to display which tasks/applications are running; when it is detected that the index finger moves away from the sixth area and presses the first area or the index finger does not move away from the sixth area but another finger presses the first area, the command is recognized as a command of displaying the menu (for example, edit menu of documents) of the program currently running; when it is detected that the index finger moves away from the sixth area and presses the sixth area again or the index finger does not move away from the sixth area but directly presses the sixth area, the command is recognized as a command of returning to the home page of user interface; and when it is detected that the first and fourth area are pressed, the command is recognized as a command of power off.

Finally, the command recognition method according to the embodiment of the present invention ends at step S199.

After the command corresponding to the operation performed on the electronic device is recognized, the recognized command is sent to the command processing/executing unit of the electronic device, so as to response to the operation that user performs on the electronic device.

Figure 4:
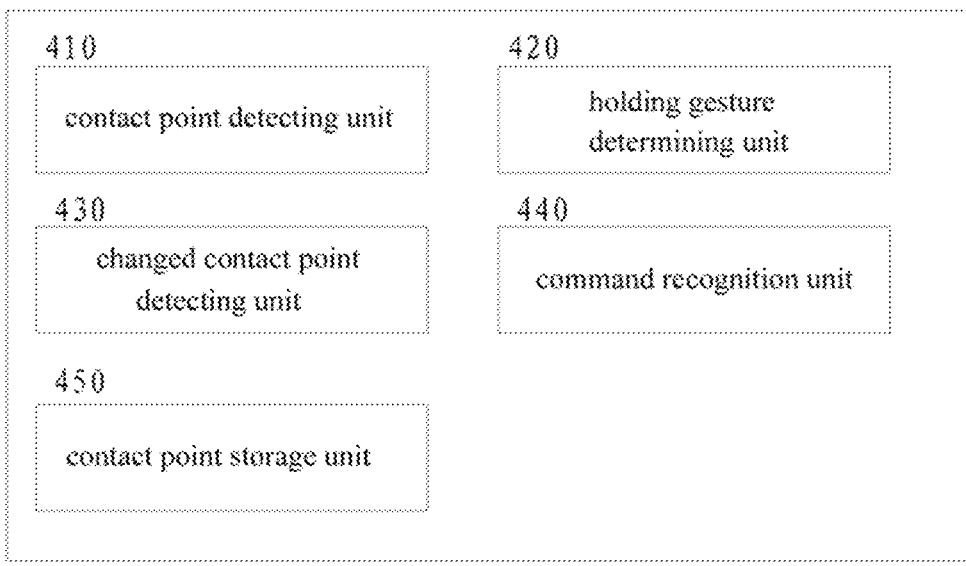
FIG. 4 illustrates block diagram of the electronic device according to the embodiment of the present invention.

FIG. 4 illustrates the electronic device 400 adopting the command recognition method 100 according to the embodiment of the present invention.

The electronic device 400 includes: contact point detecting unit 410, holding gesture determining unit 420, changed contact point detecting unit 430 and command recognition unit 440.

The contact point detecting unit 410 obtains at least two first contact points on side edge of the electronic device.

As an example, the contact point detecting unit 410 includes many sensors for sensing contact and/or pressure disposed on side edge of the electronic device 400, for example, includes pressure-sensitive, current-sensitive, temperature-sensitive, pulse-sensitive, light-sensitive sensor and so on.

Favorably, from the top of the electronic device clockwise, the side edge of the electronic device 400 is divided into 6 areas (the first to sixth area, as shown by reference numerals 1-6 on the left of FIG. 3), the contact point detecting unit 410 is disposed on each area, touching at any point within one operation area is obtained as one contact point.

However, the present invention is not limited to this. Those skilled in the art can divide more areas or less areas according to the requirement, and the size of each area can be same or different according to the requirement.

Holding gesture determining unit 420 determines the holding gesture of the electronic device according to said at least two first contact points. As an example, the holding gesture includes at least one of the following gestures: left-hand holding, right-hand holding and two-hands holding. As another example, the holding gesture includes at least one of the following gestures: left-hand lateral holding, left-hand longitudinal holding, right-hand lateral holding, right-hand longitudinal holding, two-hands lateral holding and two-hands longitudinal holding.

For example, when the contact point detecting unit 410 detects the simultaneous contacts at the second, fifth, sixth area, the holding gesture determining unit 420 recognizes the holding gestures to the electronic device is right-hand holding. In addition, when the contact point detecting unit 410 detects the simultaneous contacts at the third, fifth, sixth area, the holding gesture determining unit 420 also recognizes the holding gestures to the electronic device is right-hand holding.

For example, when the contact point detecting unit 410 detects the simultaneous contacts at the second, third, sixth area, the holding gesture determining unit 420 recognizes the holding gestures to the electronic device is left-hand holding. In addition, when the contact point detecting unit 410 detects the simultaneous contacts at the second, third, fifth area, the holding gesture determining unit 420 also recognizes the holding gestures to the electronic device is left-hand holding.

For example, when the contact point detecting unit 410 detects the simultaneous contacts at the second, third, fifth, sixth area, the holding gesture determining unit 420 recognizes the holding gestures to the electronic device is two-hands holding.

Changed contact point detecting unit 430 obtains at least one second contact point at which the contact state is changed on side edge of the electronic device within predetermined period after the holding gesture determining unit 420 determined the holding gesture.

Favorably, the electronic device 400 further includes: contact point storage unit 450, for storing the at least two first contact points obtained by the contact point detecting unit 410.

As an example, said at least one second contact point includes at least one contact point which is different from said at least two first contact points, wherein, said contact state change includes: touching said at least one contact point which is different from said at least two first contact points, such as the case shown by c) in FIG. 3.

In such case, the contact point detecting unit 410 obtains contact point on side edge of the electronic device at first timing within the predetermined period; the changed contact point detecting unit 430 extracts contact point which is not included in said at least two first contact points stored in the contact point storage unit 450 from the contact points obtained at the first timing, so as to be said at least one second contact point.

As another example, said at least one second contact point is a part of contact points in said at least two first contact points, wherein, said contact state change includes one of the following changes: moving away from said part of contact points and touching again and pressing said part of contact points; and directly pressing said part of contact points, i.e., increasing contact pressure without moving away from said part of contact points, such as the cases shown in a), e) and f) in FIG. 3.

In this case, the contact point detecting unit 410 obtains contact points at side edge of the electronic device and their corresponding contact pressure at the first timing in the predetermined period; the changed contact point detecting unit 430 extracts the at least one second contact point from the contact points obtained at the first timing, the at least one second contact point is a unit of the at least two first contact points stored in the contact point storage unit 450, and the contact pressure of each of the at least one second contact point at the first timing is larger than predetermined threshold.

As yet another example, the at least one second contact point includes: one contact point of the at least two first contact points, and the other contact point different from the at least two first contact points, wherein, the contact state change includes: moving away from said one contact point of the at least two first contact points, and touching the other contact point different from the at least two first contact points, for example, the cases shown in b) and d) of FIG. 3.

In this case, the contact point detecting unit 410 obtains contact points at side edge of the electronic device at the first timing within the predetermined period; the changed contact point detecting unit 430 extracts contact point which is not included in the contact points obtained at the first timing from the at least one first contact point stored in the contact point storage unit 450, so as to be the first part of the at least one second contact point; the contact point storage unit 450 stores contact points detected at the first timing; the contact point detecting unit 410 obtains contact points at side edge of the electronic device at a second timing within the predetermined period; and the changed contact point detecting unit 430 extracts contact point which is not included in the contact points obtained at the first timing from the contact points at side edge of the electronic device obtained at the second timing, so as to be the second part of the at least one second contact point.

Then, command recognition unit 440 recognizes corresponding commands, based on the holding gesture, the at least one second contact point and its corresponding contact state change, for example, such as photographing command, home page display command, power off command, backstage management program running command, menu display command, etc shown in FIG. 3.

Figure 5:
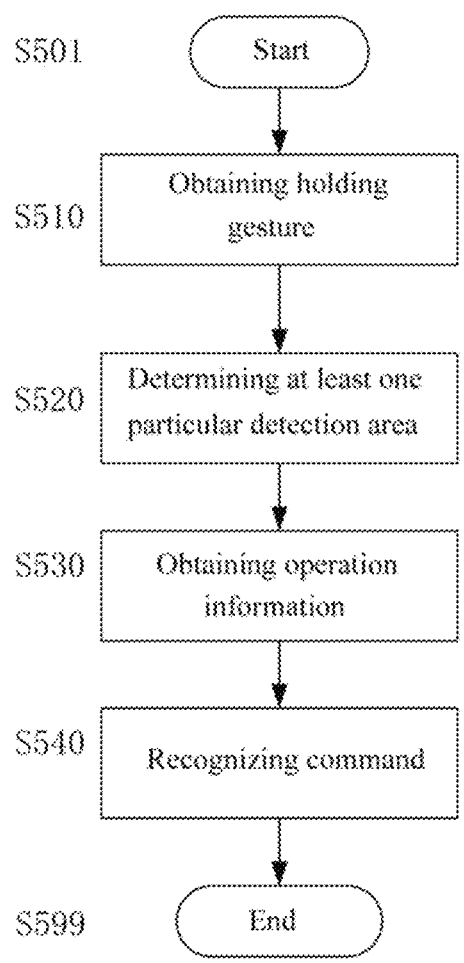
FIG. 5 illustrates flowchart of command recognition method according to another embodiment of the present invention.

In FIG. 5, it shows a command recognition method 500 according to another embodiment of the present invention, which is used for an electronic device.

Command recognition method 500 according to the embodiment of the present invention begins at step S501.

At step S510, holding gesture about the electronic device is obtained. As an example, holding gesture about the electronic device includes at least one of the following gestures: left-hand holding, right-hand holding and two-hands holding. In addition, as another example, holding gesture about the electronic device includes at least one of the following gestures: left-hand lateral holding, left-hand longitudinal holding, right-hand lateral holding, right-hand longitudinal holding, two-hands lateral holding and two-hands longitudinal holding.

At step S520, based on the holding gesture, at least one particular detection area at side edge of the electronic device is determined.

Preferably, for each holding gesture, at least one particular detection area corresponding to the gesture is set. For example, as shown in FIG. 3, in the case of right-hand holding or right-hand longitudinal holding, at least one area of the first, second, third, fourth and sixth area is set as the particular detection area; similarly, in the case of left-hand holding or left-hand longitudinal holding, at least one area of the first, second, fourth, fifth and sixth area is set as the particular detection area; in the case of two-hands holding or two-hands lateral holding, at least one area of the third and fifth area is set as the particular detection area.

To be noted that, the particular detection area corresponding to right-hand lateral holding may be different from the particular detection area corresponding to right-hand longitudinal holding, and the particular detection area corresponding to left-hand lateral holding may be different from the particular detection area corresponding to left-hand longitudinal holding.

Still, for example, the particular detection area for right-hand lateral holding may be the first, second, third and fourth area, and the particular detection area for left-hand lateral holding also may be the first, second, third and fourth area.

The setting of the particular detection area can be made in advance by the developer of the electronic device, or can be made by the user of the electronic device according to their use habits.

Preferably, each of the particular detection areas has corresponding command set, and there can be at least one command in each of the command sets. As an example, in the case of right-hand holding or right-hand longitudinal holding, the second area is set as the particular detection area, for example, when editing files, the second area is pressed, the corresponding command is cancel command, such as cancelling the edit operation just made; when playing audio, sliding upwards in the second area, the corresponding command is to increase volume, whereas sliding downwards in the second area, the corresponding command is to decrease volume; when viewing photos, sliding upwards in the second area, the corresponding command is to display the previous photo, whereas sliding downwards in the second area, the corresponding command is to display the next photo, and so on. Those skilled in the art can similarly set different commands according to different application needs.

At step S530, operation information is obtained from said at least one particular detection area. As described above, the operation information can be pressing certain particular detection area, double clicking certain particular detection area, sliding upwards in certain particular detection area or sliding downwards in certain detection area. Further, said operation information also can be sliding left or right in certain detection area.

At step S540, based on said operation information, command corresponding to the operation information is determined. For example, command corresponding to the operation information is extracted from the command set.

At last, the command recognition method according to the embodiment of the present invention ends at step S599.

Favorably, the step S530 in command recognition method 500 not only can be implemented according to the method shown in FIG. 2A-2C, but also can adopt existing track detection method, so as to detect the slide operation in the detection area.

Figure 6:
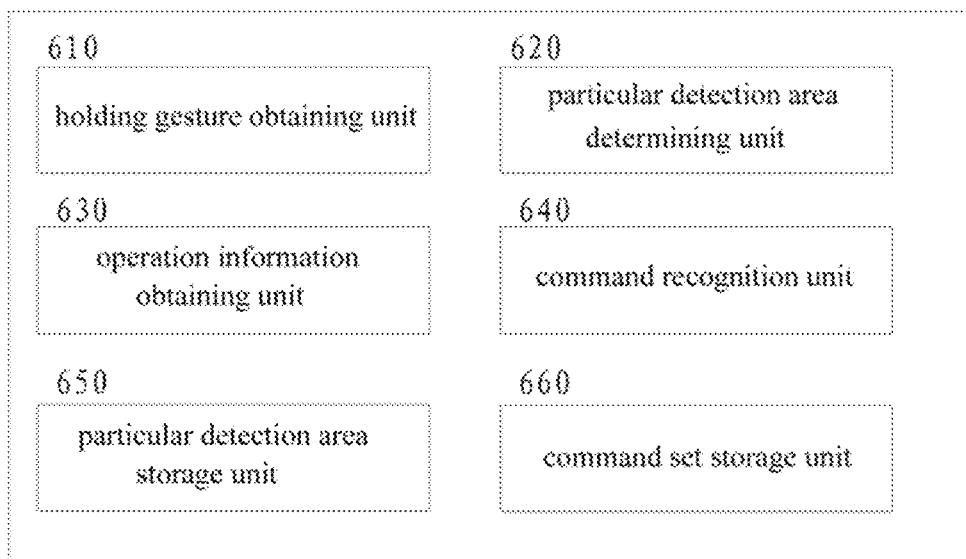
FIG. 6 illustrates block diagram of the electronic device according to another embodiment of the present invention.

FIG. 6 shows the block diagram of the electronic device 600 using command recognition method 500 according to another embodiment of the present invention.

The electronic device 600 according to the embodiment of the present invention includes: holding gesture obtaining unit 610, particular detection area determining unit 620, operation information obtaining unit 630 and command recognition unit 640.

The holding gesture obtaining unit 610 obtains the holding gesture with respect to the electronic device. For example, the holding gesture obtaining unit 610 can include the contact point detecting unit 410 and holding gesture determining unit 420 as shown in FIG. 4, wherein, at least two first contact points at side edge of the electronic device are obtained using the contact point detecting unit 410, the holding gesture with respect to the electronic device is determined according to the at least two first contact points using the holding gesture determining unit 420.

As an example, the holding gesture with respect to the electronic device includes at least one of the following: left-hand holding, right-hand holding and two-hands holding. Besides, as another example, the holding gesture with respect to the electronic device further includes at least one of the following: left-hand lateral holding, left-hand longitudinal holding, right-hand lateral holding, right-hand longitudinal holding, two-hands lateral holding and two-hands longitudinal holding.

The particular detection area determining unit 620 determines at least one particular detection area at side edge of the electronic device based on the holding gesture. Preferably, for each holding gesture, at least one particular detection area corresponding to the gesture is set. Favorably, the particular detection area corresponding to right-hand lateral holding can be different from the particular detection area corresponding to right-hand longitudinal holding, and the particular detection area corresponding to left-hand lateral holding can be different from the particular detection area corresponding to left-hand longitudinal holding.

Favorably, the electronic device 600 further includes particular detection area storage unit 650, for storing each holding gesture and at least one corresponding particular detection area. The particular detection area determining unit 620 determines at least one particular detection area at side edge of the electronic device according to the content stored in the particular detection area storage unit 650 based on the holding gesture. The settings of the particular detection area can be made in advance by the developer of the electronic device, or can be made by the user of the electronic device according their use habits.

In addition, preferably, each of the particular detection areas has corresponding command set, and there's at least one command in each of the command sets.

Favorably, the electronic device 600 further includes command set storage unit 660, for storing the operation on each particular detection area of the at least one particular detection area corresponding to each holding gesture under each holding gesture and its corresponding command.

The operation information obtaining unit 630 obtains operation information from the at least one particular detection area, which favorably includes the changed contact point detecting unit 430 as shown in FIG. 4. In addition, the operation information obtaining unit 630 can favorably include the existing contact track detecting unit, so as to detect the slide operation in the detection area. The operation information obtained by the operation information obtaining unit 630 can include at least one of the following: pressing certain particular detection area, double clicking certain particular detection area, sliding upwards or downwards in certain particular detection area, and sliding left or right in certain particular detection area.

The command recognition unit 640 recognizes command corresponding to the operation information based on the operation information, for example, extracts command corresponding to the detected operation from the command set storage unit 660.

In the electronic device according to the embodiment of the present invention, no key(s) is provided, and by detecting operation after judging holding gesture, the operation command with respect to the electronic device is recognized. The electronic device according to the embodiment of the present invention can be mobile phone, interphone, MP3, MP4, personal digital assistance, card camera and so on, which can be hold by a single hand, or even can be portable device such as PAD. Of course, the electronic device according to the embodiment of the present invention is not limited to the above examples, and is not limited to the above electronic device without any key. Even though an electronic device includes at least one key, as long as the electronic device contains the characteristic of the electronic device according to the embodiment of the present invention, and/or carries out the command recognition method according to the embodiment of the present invention, it falls into the protection scope of the present invention.

In addition, though it uses expression "side edge of the electronic device" to define the positions of the first to sixth area in the above description, those skilled in the art can simply use a certain area at the back of the electronic device to achieve such function, and such implementation is also included in the protection scope of the present invention.

It should be understood that, the command recognition method and the electronic device according to the embodiment of the present invention can be implemented in various forms of hardware, software, firmware, special purpose processors, or combinations thereof.

It also should be understood that, some of the system components and methods shown in the accompany figures are preferably implemented by software, therefore the actual connection between these system components or the process function blocks may differ according to the manner of the present invention is programmed. The description is given here, and those skilled in the art can be able to think of the present invention, these and similar implementations or configuration.

Although some embodiments of the present invention has been described by referring to the accompany figures, it should be understood that, the embodiments are only exemplary, and it is not limited thereto. Those skilled in the art should understand that various changes in forms and details may be made to these exemplary embodiments without departing from the scope and spirit of the present invention as defined in claims and equivalents thereof.

What is claimed is:

1. A command recognition method for an electronic device, the command recognition method comprises the steps of:
   obtaining at least two first contact points at a side edge of the electronic device;
   according to the at least two first contact points, determining a holding gesture with respect to the electronic device;
   obtaining at least one second contact point at which a contact state is changed on the side edge of the electronic device in a predetermined time period;
   based on the holding gesture, the at least one second contact point and its corresponding contact state change, recognizing a corresponding command by determining a corresponding instruction set and assigning a command to at least one operation area according to a current holding gesture, wherein the command indicates an operation when the contact state of the at least one second contact point corresponds to at least one operation change, and recognizing the corresponding command according to the corresponding contact state change of the at least one second contact point while maintaining the current holding gesture,
   wherein, the obtaining at least one second contact point comprises:
   obtaining contact points on the side edge of the electronic device and their corresponding contact pressures at a first timing in the predetermined time period: and extracting the at least one second contact point from the contact points obtained at the first timing, the at least one second contact point is a part of the at least two first contact points, and the contact pressure of each of the at least one second contact point at the first timing is greater than a predetermined threshold; and
   the corresponding command is recognized as a photographing command, only if the holding gesture is two hands holding,
   wherein the side edge of the electronic device is divided into six areas and contact at any point in one operation area is obtained as one contact point; and when simultaneous contacts at an upper right, a lower right, an upper left, and a lower left area of the side edge are detected, the holding gesture with respect to the electronic device is recognized as two-hands holding.

2. A command recognition method for an electronic device comprising:
   obtaining at least two first contact points at a side edge of the electronic device;
   determining a holding gesture with respect to the electronic device according to the at least two first contact points;
   obtaining at least one second contact point at which a contact state is changed on a side edge of the electronic device in a predetermined time period;
   based on the holding gesture, the at least one second contact point and its corresponding contact state change, recognizing a corresponding command by determining a corresponding instruction set and assigning a command to at least one operation area according to a current holding gesture, wherein the command indicates an operation when the contact state of the at least one second contact point corresponds to at least one operation change, and recognizing the corresponding command according to the corresponding contact state change of the at least one second contact point while maintaining the current holding gesture, wherein, the obtaining at least one second contact point comprises:

obtaining contact points on the side edge of the electronic device at a first timing in the predetermined time period; and extracting a contact point which is not included in the contact points obtained at the first timing from the at least one first contact point, so as to be a first part of the at least one second contact point; obtaining contact points on the side edge of the electronic device at a second timing in the predetermined time period;

extracting a contact point which is not included in the contact points obtained at the first timing from the contact points at side edge of the electronic device obtained at the second timing, so as to be a second part of the at least one second contact point, and the corresponding command is recognized as a photographing command, only if the holding gesture is two hands holding, wherein the side edge of the electronic device is divided into six areas and contact at any point in one operation area is obtained as one contact point; and when simultaneous contacts at an upper right, a lower right, an upper left, and a lower left area of the side edge are detected, the holding gesture with respect to the electronic device is recognized as two-hands holding.

3. The command recognition method according to claim 1, wherein, the holding gesture with respect to the electronic device comprises at least one of the following: left-hand holding, right-hand holding and two hands holding.

4. The command recognition method according to claim 3, wherein the holding gesture with respect to the electronic device is recognized as at least one of the following:

when simultaneous contacts at the upper right, the lower left, and the upper left area of the side edge are detected, the holding gesture with respect to the electronic device is recognized as right-hand holding; or when simultaneous contacts at the upper right, the lower right, and the upper left area of the side edge are detected, the holding gesture with respect to the electronic device is recognized as left-hand holding.

5. An electronic device, comprising:

a processor configured to obtain at least two first contact points at a side edge of the electronic device;

determine a holding gesture with respect to the electronic device according to the at least two first contact points;

obtain at least one second contact point at which a contact state is changed at the side edge of the electronic device in a predetermined time period after the processor has determined the holding gesture; and recognize a corresponding command based on the holding gesture, the at least one second contact point, and the corresponding contact state, and by determining a corresponding instruction set and assigning a command to at least one operation area according to a current holding gesture, wherein the command indicates an operation when the contact state of the at least one second contact point corresponds to at least one operation change, and recognizing the corresponding command according to the corresponding contact state change of the at least one second contact point while maintaining the current holding gesture;

a contact point storage configured to store at least two first contact points obtained by the processor;

wherein the processor further obtains contact points at the side edge of the electronic device at a first timing in the predetermined time period;

the processor obtains contact points at side edge of the electronic device and their corresponding contact pressures at a first timing in the predetermined time period: and the processor extracts the at least one second contact point from contact points obtained at the first timing, the at least one second contact point is a part of the at least two first contact points stored in the contact point storage, and contact pressure of each contact point of the at least one second contact point at the first timing is greater than a predetermined threshold, the corresponding command is recognized as a photographing command, only if the holding gesture is two hands holding, wherein the side edge of the electronic device is divided into six areas and contact at any point in one operation area is obtained as one contact point; and when simultaneous contacts at an upper right, a lower right, an upper left, and a lower left area of the side edge are detected, the holding gesture with respect to the electronic device is recognized as two-hands holding.

6. An electronic device comprising:

a processor configured to obtain at least two first contact points at a side edge of the electronic device;

determine a holding gesture with respect to the electronic device according to the at least first two contact points;

obtain at least one second contact point at which a contact state is changed at the side edge of the electronic device in a predetermined time period after the processor has determined the holding gesture;

recognize a corresponding command based on the holding gesture, the at least one second contact point, the corresponding contact state, and by determining a corresponding instruction set and assigning a command to at least one operation area according to a current holding gesture, wherein the command indicates an operation when the contact state of the at least one second contact point corresponds to at least one operation change, and recognizing the corresponding command according to the corresponding contact state change of the at least one second contact point while maintaining the current holding gesture; and, a contact point storage, for storing at least two first contact points obtained by the processor, wherein, the processor further obtains contact points at side edge of the electronic device at a first timing in the predetermined time period; the processor extracts a contact point which is not included in the contact points obtained at the first timing from the at least two first contact points stored in the contact point storage, so as to be a first part of the at least one second contact points; the processor further obtains contact points at the side edge of the electronic device at a second timing in the predetermined time period; and the processor extracts a contact point which is not included in the contact points obtained at the first timing from contact points at side edge of the electronic device obtained at a second timing, so as to be a second part of the at least one second contact point, the corresponding command is recognized as a photographing command, only if the holding gesture is two hands holding, wherein the side edge of the electronic device is divided into six areas and contact at any point in one operation area is obtained as one contact point; and when simultaneous contacts at an upper right, a lower right, an upper left, and a lower left area of the side edge are detected, the holding gesture with respect to the electronic device is recognized as two-hands holding.

7. The device according to claim 5, wherein, the holding gesture includes at least one of the following: left-hand holding, right-hand holding and two hands holding.

* * * * *